United States Patent [19]

Renaud

[11] 3,745,239

[45] July 10, 1973

[54] DECODING SYSTEM FOR A PAL COLOR TELEVISION RECEIVER

[75] Inventor: Donald E. Renaud, Stone Park, Ill.

[73] Assignee: Motorola, Inc., Franklin Park, Ill.

[22] Filed: Mar. 2, 1972

[21] Appl. No.: 231,304

[52] U.S. Cl. .......... 178/5.4 P

[51] Int. Cl. .......... H04n 9/50

[58] Field of Search .......... 178/5.4 R, 5.4 P

[56] References Cited

UNITED STATES PATENTS

| | | | |
|---|---|---|---|
| 3,553,357 | 1/1971 | Carnt | 178/5.4 P |
| 3,627,910 | 12/1971 | Janssen et al. | 178/5.4 P |

*Primary Examiner*—Richard Murray
*Attorney*—Vincent Rauner and E. Parsons

[57] ABSTRACT

A delay line type separator supplying first burst and chrominance signals to one input of a signal adding circuit and second burst and chrominance signals, through phase adjusting and gating circuits to a second input of the signal adding circuit. The phase adjusting and gating circuits include a phase splitter supplying an inverted and noninverted second chrominance signal through two diode gates and a 90° phase shifted second burst signal through a third diode gate. The output of the signal adding circuit, during burst transmission, is processed to produce a square pulse with a repetition rate equal to the sum of the first burst signal and the 90° phase shifted second burst signal, or one half the repetition rate of the transmitted burst signals. The square pulse is utilized as a gating pulse to cause the diodes to supply alternately inverted second chrominance signals to the adding circuit.

8 Claims, 3 Drawing Figures

Patented July 10, 1973 3,745,239

2 Sheets-Sheet 1

Patented July 10, 1973 3,745,239

2 Sheets-Sheet 2

DECODING SYSTEM FOR A PAL COLOR TELEVISION RECEIVER

BACKGROUND OF THE INVENTION

1. Field of the Invention

In color television transmitting and receiving apparatus there are two major three-color systems, one of which is known as the NTSC (National Television System Committee) system and the other of which is known as the PAL (Phase Alternation Line) system. In both systems a composite signal is broadcast, which signal includes a relatively wide band luminance signal and a relatively narrow band chrominance signal. In each system the chrominance signal includes two independent functions of hue and saturation with each function containing sufficient information to enable matrixing circuitry to reproduce three electrical signals representative of the three colors making up the original image. Because phase errors in the functions can substantially alter the color of the reproduced picture, the PAL system inverts one of the functions in alternate lines to reduce the phase error. It should be noted that there are other differences between the NTSC and PAL systems but the other differences do not affect the present invention.

Within the PAL system and whenever it is desired to receive PAL transmissions on an NTSC receiver, it is necessary to invert the originally inverted function on alternate lines. Further, because the burst or synchronizing signal in the PAL system is formed of two components or signals, one of which is reversed in phase (180°) on alternate lines, it is necessary to convert the two burst signals to a single, constant phase burst signal. The constant phase burst signal is then utilized to lock an oscillator on the burst frequency, which oscillator is utilized to supply carrier frequency to the chrominance demodulators for demodulating the single sideband, suppressed carrier chrominance signals.

2. Description of the Prior Art

In the prior art many circuits have been devised for deriving a synchronizing signal from the transmitted burst signals. In general, these circuits utilize discriminators or the like and are relatively complicated and expensive. Further, these circuits are constructed to remain operative throughout the entire period between burst signals, which greatly increases noise susceptibility.

SUMMARY OF THE INVENTION

The present invention pertains to a decoding system for a color television receiver adapted to receive PAL type transmissions, which system includes separator means for separating the composite transmitted signal into first and second burst signals and first and second functions (chrominance signals) of hue and saturation; phase splitter means providing at outputs thereof the first function, the first function inverted and the first burst signal shifted approximately 90° in phase; signal adding means receiving the second burst and second function on one input thereof and, through gating means, receiving on a second input the first burst signal shifted 90° in phase when the second burst signal appears on the other input and the first function, inverted for alternate lines, when the second function appears on the other input; and means utilizing the output of the adding means to produce gating pulses having a repetition rate one half the repetition rate of the burst signals.

It is an object of the present invention to provide an improved decoding system for color television receivers adapted to receive PAL type transmissions.

It is a further object of the present invention to provide an improved decoding system which is less susceptible to noise and relatively less expensive.

These and other objects of this invention will become apparent to those skilled in the art upon consideration of the accompanying specification, claims and drawings.

BRIEF DESCRIPTION OF THE DRAWINGS

Referring to the drawings.

DESCRIPTION OF THE PREFERRED EMBODIMENT

Figure 1:
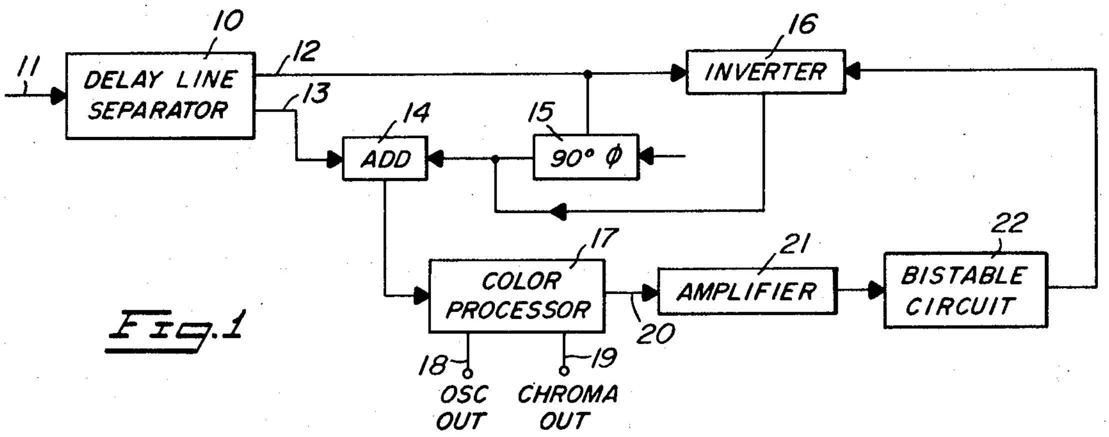
FIG. 1 is a block diagram of a decoding system for a television receiver embodying the present invention.

Referring specifically to FIG. 1, a delay line separator 10 is illustrated having an input 11 adapted to receive a composite television signal such as a PAL type transmission, and two outputs 12 and 13. The separator 10 separates the composite television signal applied to the input 11 into a first burst and chrominance signal, which appears on output 12, and a second burst and chrominance signal, which appears on output 13. Output 13 is connected to one input of signal adding means 14 and output 12 is connected to phase shifting means 15 and one input of inverter means 16. The phase shift means 15 receives the first burst signal and shifts it 90° in phase after which it is applied to a second input of the signal adding means. The inverter 16 inverts alternate lines of the first chrominance signal and supplies the inverted and noninverted chrominance signals to the input of the signal adding means 14. The output of the signal adding means 14 is supplied to a color processing circuit 17, which is an integrated circuit including a locked oscillator, for supplying chrominance carrier signals at an output 18, gating and amplifying circuits for supplying chrominance signals at an output 19, and circuits such as an envelope detector and an integrator for developing at an output 20 a ramp type signal, having a repetition rate equal to one half the repetition rate of the burst signals at the output of the separator 10. The ramp signals are applied to an amplifier 21, where they are changed to a sinusoidal type signal, and utilized to trigger a bistable circuit 22. The bistable circuit 22 produces a substantially square wave which is utilized to gate the inverter 16. One embodiment of circuitry utilized to arrive at the signals described in conjunction with FIG. 1 is illustrated in FIG. 2.

Figure 2:
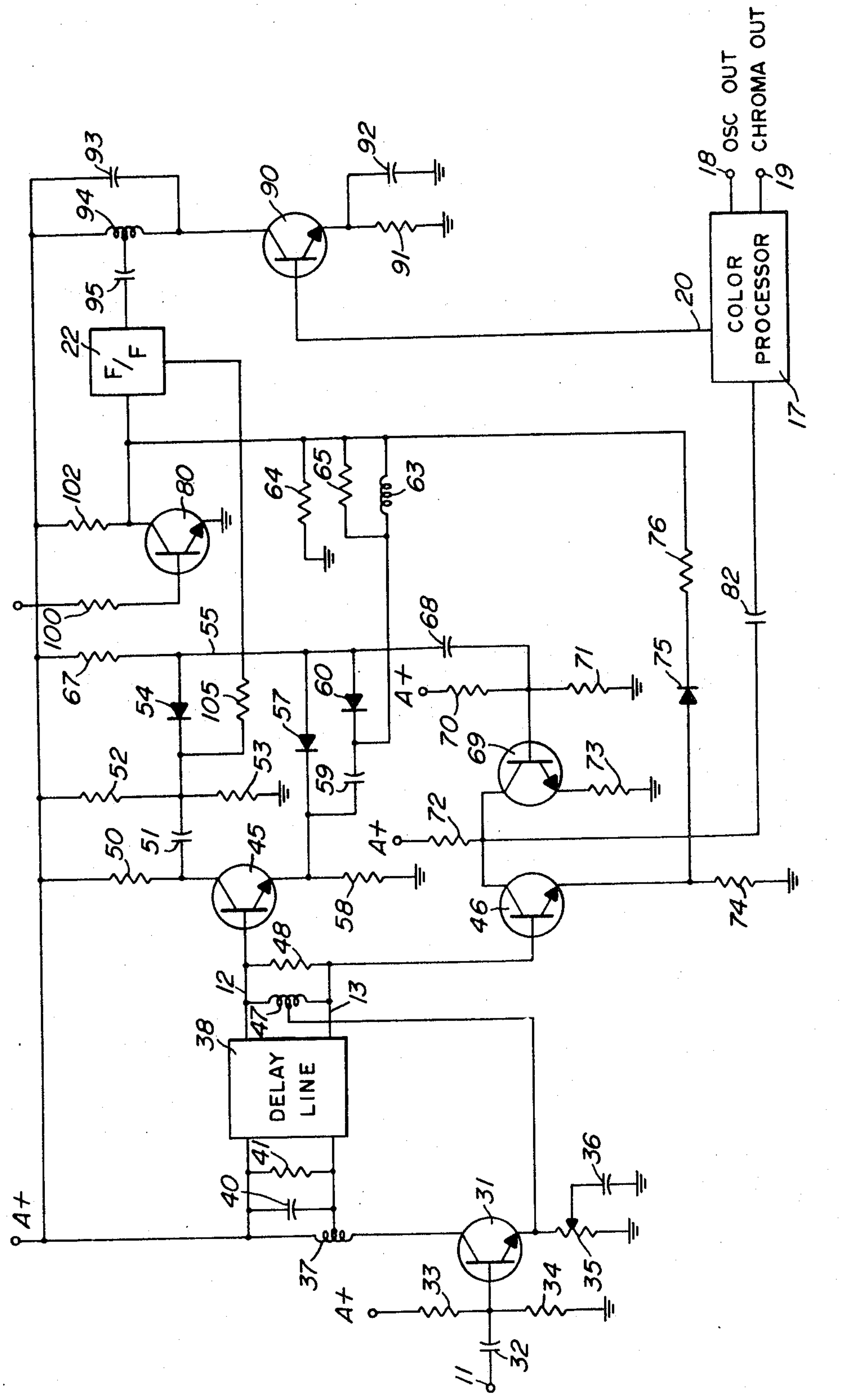
FIG. 2 is a schematic representation of the system illustrated in FIG. 1.

Referring specifically to FIG. 2, video input terminal 11 is connected to the base of a transistor 31 through a coupling capacitor 32. The base of the transistor 31 is also connected to the junction of a pair of resistors 33 and 34, which form a voltage divider between a positive voltage source and common or ground. The emitter of the transistor 31 is connected through a potentiometer 35 to ground, the movable contact of which is connected through a capacitor 36 to ground. The collector of the transistor 31 is connected through a tapped adjustable coil 37 to the positive voltage source. The tap of the coil 37 is connected to one input of a delay line 38, which is a typical delay line utilized in PAL type receivers, and a second input of the delay line 38 is connected to the positive voltage source. A capacitor 40 and a resistor 41 are connected in parallel between the two inputs of the delay line 38.

Figure 3:
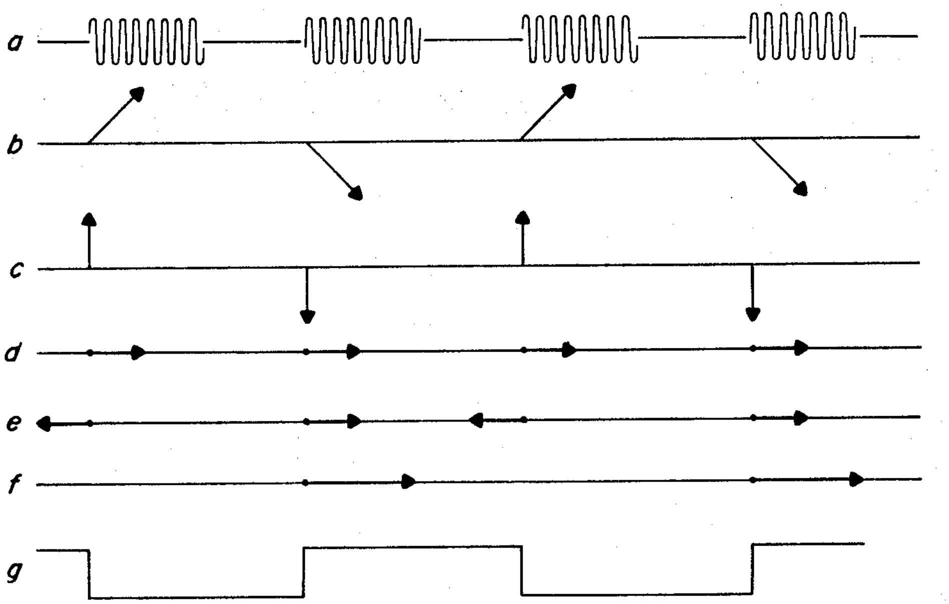
FIG. 3 illustrates in wave and vector form some of the signals present in the circuitry of FIGS. 1 and 2.

The delay line 38 has a pair of outputs 12 and 13. Output 12 is connected directly to the base of a transistor 45 and output 13 is connected directly to the base of a transistor 46. A tapped coil 47 and a resistor 48 are connected in parallel between the outputs of the delay line 38. The tap of the coil 47 is returned to the emitter of the transistor 31. The delay line 38, the transistor 31 and the associated circuitry comprise separator means 10 for receiving a composite television signal (including burst signals and chrominance signals) on the terminal 11 and providing first burst and chrominance signals at the base of transistor 45 and second burst and chrominance signals at the base of transistor 46 (these signals will be described in more detail with reference to FIG. 3).

The collector of transistor 45 is connected through a resistor 50 to the positive voltage source. The collector of the transistor 45 is also connected through a coupling and DC blocking capacitor 51 to the junction of two resistors 52 and 53, connected in series between the positive voltage source and ground to form a voltage divider. The junction of the resistors 52 and 53 is connected to the cathode of a diode 54, the anode of which is connected to a line 55. The emitter of the transistor 45 is connected to the cathode of a diode 57, the anode of which is connected to the line 55, and through a resistor 58 to ground. A capacitor 59 is connected between the emitter of the transistor 45 and the cathode of a diode 60, the anode of which is connected to the line 55. The transistor 45 and its associated circuitry forms a phase splitter stage and the diodes 54, 57 and 60 form gating means, which upon being properly biased (as will be described presently) supply inverted first chrominance signals, noninverted first chrominance signals and first burst signals shifted 90° in phase, respectively, to the line 55. To arrive at the 90° phase shift of the first burst signal, the cathode of the diode 60 is connected through a series connected coil 63 and resistor 64 to ground. The coil 63 and capacitor 59 are tuned to provide the desired phase shift. A resistor 65 is placed in parallel with the coil 63 to adjust the amplitude of the first burst signal at the cathode of the diode 60 by adjusting the circuit Q of the coil 63.

One end of the line 55 is connected through a resistor 67 to the positive voltage source and the other end is connected through a coupling capacitor 68 to the base of a transistor 69. The base of the transistor 69 is further connected to the junction of a pair of resistors 70 and 71, which are connected in series between the positive voltage source and ground to form a voltage divider. The collectors of the transistors 46 and 69 are connected together and through a resistor 72 to the positive voltage source. The emitter of the transistor 69 is connected through a resistor 73 to ground. The emitter of the transistor 46 is connected through a resistor 74 to ground and to the anode of a diode 75, the cathode of which is connected through a resistor 76 to the collector of a transistor 80. A capacitor 82 is connected between the common collectors of transistors 46 and 69 and an input of a color processor integrated circuit network 17. The transistors 46 and 69 and their associated circuitry form signal adding means 14 which add signals applied to the inputs thereof, at the bases of the transistors 46 and 69, and supply a signal proportional to the sum of the inputs at an output thereof, at the common collectors of the transistors 46 and 69.

The color processing circuit 17 contains a plurality of integrated circuits which are not illustrated in detail because they are standard circuits known to those skilled in the art and because they do not form a portion of this invention. The signals applied to the color processing circuit 17 through the capacitor 85 include burst and chrominance signals, which signals are processed to provide chrominance signals at an output 19, for demodulation and further processing by other circuits of the television receiver, a locked oscillator signal on an output 18, utilized in the demodulation of the chrominance signals, and a generally ramp shaped voltage with a repetition rate equal to the repetition rate of the burst signals applied to the color processor 17 through the capacitor 85, which ramp signal appears on an output 20. The ramp signal may be produced, for example, by envelope detecting the applied burst signal and integrating the envelope. The output 20 of the color processing circuit 17 is connected to the base of a transistor 90.

The emitter of the transistor 90 is connected through the parallel combination of a resistor 91 and a capacitor 92 to ground. The collector of the transistor 90 is connected through the parallel combination of a capacitor 93 and a tunable tapped coil 94 to the positive voltage source. The tap of the coil 94 is connected through a capacitor 95 to an input of a bistable circuit 22, which in this embodiment is a JK type flip-flop integrated circuit. The transistor 90 and its associated circuitry form an amplifier with a tuned circuit (capacitor 93 and coil 94) in the collector circuit which receives the ramp type signals and produces a sinewave having a frequency equal to the repetition rate of the ramp type signal. This sinewave is applied through the capacitor 95 to the bistable circuit 22 to cause the operation thereof.

The transistor 80 has an emitter connected directly to ground and a base connected through a resistor 100 to a terminal 101 adapted to have applied thereto a gating pulse having a duration approximately equal to one burst synchronizing signal and occurring with the burst prior to each horizontal line. The gating pulse may be, for example, the horizontal blanking pulse on which each burst synchronizing signal is superimposed during transmission. The collector of the transistor 80 is connected through a resistor 102 to the positive voltage source. The collector of the transistor 80 is further connected to an input of the bistable circuit 22 and to the junction of the coil 63 and resistor 64. The transistor 80 serves as a gating pulse amplifier which receives a positive gating pulse and supplies an inverted or negative gating pulse to the bistable circuit 22 and, through the coil 63, to the cathode of the diode 60 to bias the diode 60 into conduction. The output of the bistable circuit 22 is a substantially square wave which is supplied through a resistor 105 to the cathode of diode 54 to bias the diode 54 into conduction during the negative portions of the wave.

In the operation of the embodiment of the present system illustrated in FIG. 2, a composite television signal, including burst and chrominance signals for each line, are applied to the input terminal 11. The composite signal is the type utilized in PAL systems wherein the phase of the burst signal is altered every other line and the phase of one of the functions of hue and saturation is inverted for every other line. To simplify the present description of the operation, the two functions of hue and saturation making up the chrominance signal will be referred to as R–Y and B–Y, although it should be understood that substantially any of the functions utilized may be incorporated herein. The separation of the two functions of chrominance signals by means of a separator utilizing a delay line will not be elaborated upon, since this operation is well known to those skilled in the art. The separator means, which separates the chrominance signal into its two functions or components, also separates the burst signal into two components, which for convenience will be referred to hereinafter as the R–Y burst signal and the B–Y burst signal.

Referring to FIG. 3*a*, a series of single burst synchronizing signals is illustrated with the chrominance signal for each line between the single burst signals eliminated. In FIG. 3*b* each single burst signal is represented by a vector to illustrate the shift in phase of alternate single burst signals. FIG. 3*c* and 3*d* illustrate the two components of the burst signal separated into an R–Y burst signal in FIG. 3*c* and a B–Y burst signal in FIG. 3*d*. The R–Y burst signal of FIG. 3*c* is supplied to the base of the transistor 45 from the delay line 38 and the B–Y burst signal of FIG. 3*d* is supplied to the base of transistor 46 from the delay line 38. The R–Y chrominance function (not shown) interspersed between the single R–Y burst signals is also supplied to the base of transistor 45 and, as is well known to those skilled in the art, is alternately inverted. The B– Y chrominance function (not shown) interspersed between the B–Y burst signal is also applied to the base of the transistor 46. It should be understood that the functions could be reversed or the burst signals could be reversed, if desired, and the particular signals are illustrated in the present connection only for exemplary reasons.

When the R–Y burst signal is applied to the base of transistor 45 and, consequently, appears at the emitter thereof in phase, the inverted blanking pulse available on the collector of transistor 80 is applied to the cathode of the diode 60 to forward bias the diode 60. The R–Y burst signal, shifted 90° by the action of capacitor 59 and coil 63, is conducted through the diode 60 and capacitor 68 to the base of transistor 69. Since the R–Y and B–Y burst signals are coexistent, when the R–Y burst signal is applied to the base of transistor 69 the B–Y burst signal is applied to the base of transistor 46. The R–Y burst signal shifted 90° in phase is illustrated in FIG. 3*e*, vectorially, and, it can be seen, that the addition of the B–Y burst signal of FIG. 3*d* and the R–Y burst signal of FIG. 3*e* will result in the cancellation, or substantial reduction in amplitude, of alternate burst signals, as illustrated in FIG. 3*f*. Thus, a signal is present on the common collectors of transistors 46 and 69 having a repetition rate equal to one half of the repetition rate of the burst signal and a constant phase. This signal is applied to the color processing circuit 17.

As previously described the color processing circuit 17 converts the alternate burst signals applied thereto into ramp type signals with the same repetition rate. These ramp type signals are applied to the base of transistor 90 wherein they are converted to a sinusoidal signal having a frequency equal to the repetition rate of the ramp type signal. The sinusoidal signal is applied to the bistable circuit 22 and, in conjunction with the gating pulse from the collector of the transistor 80, causes the bistable circuit 22 to produce square pulses at a repetition rate one half the repetition rate of the burst signals as shown in FIG. 3*g*. It should be noted that the bistable circuit changes states half the distance between the alternate burst signals present on the collectors of transistors 46 and 49 or at the position of the cancelled burst signals. By cancelling alternate single burst signals, the remaining burst signals are accurately identified by the circuitry and the possibility of the circuitry synchronizing on the wrong burst signal is reduced or eliminated. Further, the burst signals applied to the color processing circuit 17 are of a single phase and can be utilized to synchronize an oscillator in accordance with normal NTSC procedures.

The square wave from the bistable circuit 22 is applied to the cathode of the diode 54 so that the diode 54 is biased into conduction during the period that the square wave is negative (approximately one half of a complete cycle) and biased into nonconduction during the period that the square wave is positive. Thus, the sequence of operation in the gating circuits is as follows. A relatively sharp negative pulse, from the collector of the transistor 80, is supplied to the bistable circuit 22 to begin the negative portion of the square wave therefrom. The sharp negative pulse is also applied to the cathode of the diode 60 and biases the diode 60 into conduction. In the present embodiment the ambient voltage applied to the cathode of the diode 60 is approximately 5 volts while the sharp negative pulse drops the voltage to approximately one-tenth of a volt. When the voltage on the cathode of the diode 60 drops to approximately one-tenth of a volt the voltage on the anode becomes approximately eight-tenths of a volt and the anodes of diodes 54 and 57, which are connected to the anode of the diode 60, are at the same voltage. The cathode of the diode 57 is attached to the emitter of transistor 45, which is at approximately 1.7 volts so that the diode 57 is nonconducting. The negative portion of the square wave from the bistable circuit 96 drops to approximately 0.9 volts while the ambient or positive portion is at approximately 4 volts. Therefore, with the cathode of the diode 54 at 0.9 volts that diode is also nonconducting. Thus, the R–Y burst signal, shifted 90° in phase, passes through the conducting diode 60 and is applied to the base of the transistor 69. The R–Y and B–Y burst signals are added, as previously described, to provide an output only during alternate bursts.

Upon removal of the sharp negative pulse from the collector of the transistor 80, the cathode of diode 60 rises to five volts and biases the diode 60 into nonconduction. Since the diode 60 no longer maintains the line 55 at 0.8 volts, line 55 begins to rise toward the positive voltage source (plus 20 volts in this embodiment). The duration of the negative portion of the square wave from the bistable circuit 22 is substantially longer than the duration of the sharp negative pulse from the collector of transistor 80 and, therefore, is still present on the cathode of the diode 54. Since the cathode of the diode 54 is at 0.9 volts the voltage on the line 55 will rise to approximately 1.6 volts. Since the cathode of the diode 57 is at 1.7 volts and the cathode of the diode 60 is at 5 volts, neither of these diodes will be conducting. Thus, the inverted R–Y function is conducted through the diode 54 to the base of the transistor 69 where it is added to the coincident B–Y function.

At the end of the line the square wave from the bistable circuit 22 switches and becomes positive approximately 4 volts. Since the cathode of the diode 54 is approximately 4 volts and the cathode of the diode 60 is approximately 5 volts the diodes are biased into a nonconducting state and the voltage on the line 55 begins to rise toward the positive voltage source. The cathode of the diode 57 is at approximately 1.7 volts and, therefore, the diode 57 clamps the voltage on the line 55 at approximately 2.4 volts. The noninverted R–Y function is conducted through the diode 57 to the base of the transistor 69 where it is added to the coincident B–Y function. Thus, it can be seen that the R–Y function for alternate lines is inverted to provide an NTSC type composite signal at the output of the signal adding circuit 14 and the input of the color processing circuit 17. Further, the gating circuit is constructed to allow passage of only the desired signal, during the time that the signal is present, and to prevent the passage of signals, such as noise and the like, at other times. Because the signal adding circuit is relatively inexpensive, compared to discriminators, demodulators and the like, the present system is relatively simple and inexpensive.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

I claim:

1. A decoding system for a color television receiver utilizing a separator circuit incorporating a delay line to separate first and second independent functions of hue and saturation and corresponding first and second burst signals preceding each line of said functions in a composite television signal received thereby, said system comprising:

a. phase shift means coupled to the separator circuit for receiving the first burst signal and providing said first burst signal shifted approximately 90° in phase at an output thereof;

b. signal adding means coupled to the separator circuit for receiving the second burst signal and coupled to said phase shift means for receiving the phase shifted burst signal therefrom and providing at an output thereof a signal with a repetition rate one half the repetition rate of said first burst signal;

c. circuit means coupled to said signal adding means for receiving the signal therefrom and operating on said signal to provide a trigger signal with a repetition rate one half the repetition rate of said first burst signal;

d. inverter means connected to receive said trigger signal and the first function and to invert alternate lines of said first function in response to said trigger signal; and e. means coupling the alternate inverted and noninverted first function and the second function to said signal adding means for providing a composite television signal at an output thereof.

2. A decoding system as set forth in claim 1 wherein the circuit means includes a bistable circuit coupled to the inverter means for providing a substantially square pulse thereto.

3. A decoding system as set forth in claim 2 wherein the circuit means further includes circuitry coupled to the bistable circuit for supplying a signal thereto to switch the bistable circuit through a complete operation in response to each repetition of the signal from the signal adding means.

4. A decoding system as set forth in claim 3 wherein the circuitry includes a tuned circuit for providing a sinusoidal wave to switch the bistable circuit at predetermined points relative to the axis of the sinusoidal wave.

5. A decoding system as set forth in claim 1 wherein the phase shift means and the inverter means include a phase splitter stage connected to the separator circuit for receiving the first burst signal and the first function and a plurality of gated diodes connected to said phase splitter stage for sequentially coupling to the adding means one of the first burst signal shifted approximately 90°, the first function inverted and the first function noninverted.

6. A decoding system for a color television receiver adapted to receive first and second independent functions of hue and saturation, the first function being phase inverted for alternate lines, and corresponding first and second burst signals preceding each line of said functions in a composite television signal, said system comprising:

a. separator means adapted to receive the composite television signal for separating the composite signal into the first burst signal and the first function on a first output and the second burst signal and the second function on a second output;

b. phase splitter means connected to the first output of said separator means for providing at outputs thereof the first function, the first function inverted and the first burst signal shifted approximately 90° in phase;

c. signal adding means having two inputs and an output, signals on the output being proportional to the sum of signals on the two inputs, and one of said inputs being connected to the second output of said separator means for receiving the second burst signal and the second function alternately thereon;

d. gating means coupling the outputs of said phase splitter means to the other of the inputs of said adding means; and e. means coupled between the output of said adding means and the gating means for operating said gating means to supply the second burst signal shifted approximately 90° in phase on the other input of said adding means when the first burst signal appears on the one input of said adding means and to supply the second function, alternately inverted, on the other input of said adding means when the first function appears on the one input of said adding means.

7. A decoding system as set forth in claim 6 wherein the gating means includes a plurality of diodes.

8. A decoding system as set forth in claim 6 wherein the means coupled between the output of the adding means and the gating means includes circuitry responsive to the sum of the second burst signal and the first burst signal shifted 90° in phase for providing a sinusoidal signal having a frequency equal to the repetition rate of said sum and further includes bistable means connected to said circuitry and responsive to the sinusoidal signal for providing substantially square gating pulses having a repetition rate one half the repetition rate of the first burst signal.

* * * * *